United States Patent

[11] 3,580,314

[72] Inventor Juan E. Besora
Avda. del Generalisimo, Franco No. 614–30 la, Barcelona, Spain
[21] Appl. No 772,180
[22] Filed Oct. 31, 1968
[45] Patented May 25, 1971
[32] Priority Nov. 3, 1967
[33] Spain
[31] 133,678

[54] JUICE EXTRACTOR
6 Claims, 2 Drawing Figs.

[52] U.S. Cl. .................................................. 146/3
[51] Int. Cl. .................................................. A23n 1/02, A47j 19/02
[50] Field of Search .................................... 146/3, 3.6, 3.7, 3.9

[56] References Cited
UNITED STATES PATENTS
| | | | |
|---|---|---|---|
| 325,099 | 8/1885 | Manny | 146/3(.6) |
| 1,757,609 | 5/1930 | Beardsley et al. | 146/3(.6) |
| 2,057,227 | 10/1936 | Blum | 146/3(.6) |
| 2,121,621 | 6/1938 | Adams | 146/3(.7) |

Primary Examiner—Willie G. Abercrombie
Attorney—Michael S. Striker

ABSTRACT: A juice extractor for citrus fruits and the like has a receptacle the upper side of which is open. A pulping member in form of an inverted bowl is mounted for rotation in the receptacle projecting upwardly beyond the open upper side thereof. The outer surface of the pulping member is provided with ribs. A handle is provided on the pulping member and extends outwardly through a slot in the circumferential wall of the receptacle so that the pulping member may be turned about the axis of the receptacle. A cap is pivoted to the receptacle and may be moved to a closed position in which it overlies the pulping member so as to compress a piece of fruit between the latter and the inside of the cap so that, when the pulping member is turned by means of the handle, the fruit will be pulped and juice extracted.

PATENTED MAY 25 1971

3,580,314

INVENTOR
JUAN ESPEL BESORA

BY Michael S. Striker
ATTORNEY

JUICE EXTRACTOR

BACKGROUND OF THE INVENTION

The present invention relates generally to juice extractors, and more particularly to juice extractors for extracting juice from citrus fruits and the like.

Juice extractors are of course already known. They suffer from some drawbacks, however, including the fact that they are frequently difficult to clean because their various parts are not readily accessible, and also because they quite often do not extract the juice as fully as is desirable.

It is therefore a general object of the invention to provide an improved juice extractor which is particularly suitable for citrus fruits and the like.

Another object of the invention is to provide such an improved juice extractor the elements of which are all readily accessible for cleaning and, if desired, even for sterilization.

An additional object of the invention is to provide such a juice extractor which is very solid in its construction and can therefore be used in commercial as well as household applications.

A concomitant object of the invention is to provide such a juice extractor which will extract the maximum possible amount of juice from any given piece of fruit.

SUMMARY OF THE INVENTION

In accordance with the above objects, and others which will become apparent hereafter, one feature of my invention resides in the provision of a juice extractor having a receptacle provided with another opening. A pulping member of inverted substantially bowl-shaped configuration is mounted for rotary movement about the axis of the opening in the receptacle and projects upwardly beyond this opening. The outer surface of this pulping member is provided with a plurality of ribs projecting therefrom. Handle means is connected with the pulping member and projects outwardly from the receptacle so that it may be grasped by the fingers of an operator whereby the pulping member may be turned about the aforementioned axis so that, when a piece of fruit is pressed onto the pulping member and the latter is so turned, the ribs will be pressed into the fruit flesh, pulping the same and extracting juice therefrom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
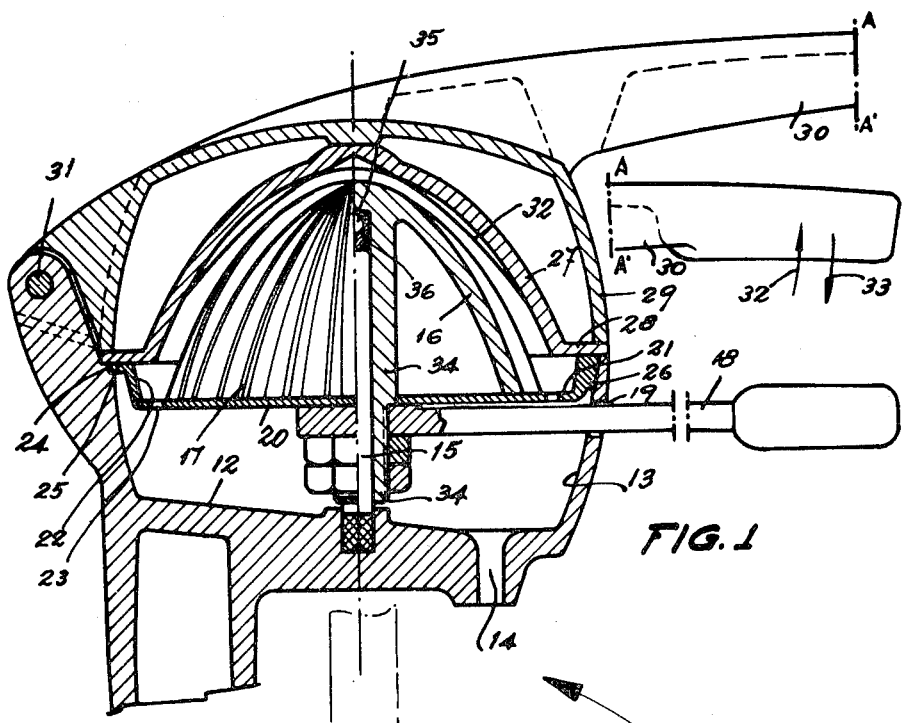
FIG. 1 is a sectional elevation of an extractor embodying my invention.

My novel juice extractor is generally identified with reference numeral 10 and comprises a base or receptacle 11 having a sloping bottom wall 12 provided at or near the lowest point with a juice outlet 14 which is located adjacent the inner circumferential surface 13 of the circumferential sidewall of the receptacle. A shaft 15 is secured in the bottom wall 12 and projects upwardly beyond the upper open end bounded by the circumferential sidewall. A bushing 34 is telescoped over the shaft 15 and advantageously the upper free end face of the shaft 15 will be provided, as illustrated in the drawing, with a depression 36 in which there is located a spherical body 35 constituting antifriction means and on which the closed end of the bushing 34 rests. This facilitates free turning movement of the bushing 34 about the shaft 15.

As illustrated in the drawing, the bushing 34 is integral with an inverted-bowl-shaped pulping member 16 of substantially paraboloid outside contour. However, the bushing could also be separate and the pulping member 16 could be suitably secured thereto. In any case, the open side of the member 16 faces the interior of the receptacle whereas its closed side projects upwardly beyond the upper open end of the receptacle. The outer circumferential face of the member 16 is provided in conventional manner with projecting ribs or ridges 17 extending from the closed towards the open side of the member 16. A shallow tray 20 is provided in its bottom wall 21 with a cutout for which the shaft 15 with its bushing 34 extends, and with a plurality of circumferentially distributed apertures 23 so selected as to permit passage of juice into the interior of the receptacle while straining out pulp. A circumferential lip or flange 25 projects radially of the circumferential wall 23 of the tray 20 and is seated in an annular recess 24 provided in the circumferential wall of the receptacle 11 in the region of the upper open end of the latter. The tray 20 is thus seated on the circumferential wall of the receptacle 11 and the flange 25 is provided with at least one downwardly extending projection 26 received in a complementary enlargement of the recess 24 so as to prevent rotation of the tray 20 with respect to the receptacle 11. The lower end of the member 16 abuts against or is very closely located to the bottom wall 21 of the tray 20.

Advantageously I provide a cap member 27 which is pivoted to the receptacle 11 as indicated at 31, and the inner side of which faces the member 16 when the cap member 27 is in the closed position illustrated in FIG. 1 in which it overlies the member 16. The inner side of the cap member 27 is provided with a plurality of ribs or ridges 32 corresponding to the ribs or ridges 17 on the member 16, but intended to prevent rotation of a piece of fruit squeezed between the cap member 27 and the member 16 so that, when the cap member 27 is in the position illustrated in FIG. 1, such fruit will be pressed against the ribs 17 on the member 16 and held in this position while the member 16 is rotated via the handle 18. The cap member 27 actually consists of two parts, namely an outer shell part 29 with which the inner portion of the cap member is connected by means of a wing or annular flange 28. The shell 29 is also provided with a handle 30 by means of which it may be pressed to closed position so as to squeeze a piece of fruit between the ribs 32 and ribs 17 when the handle 30 is moved in the direction of the arrow 33 in FIG. 1, while the cap member 27 may be lifted to open position by tilting about the pivot 31 when the handle is moved in the direction of the arrow 32.

Figure 2:
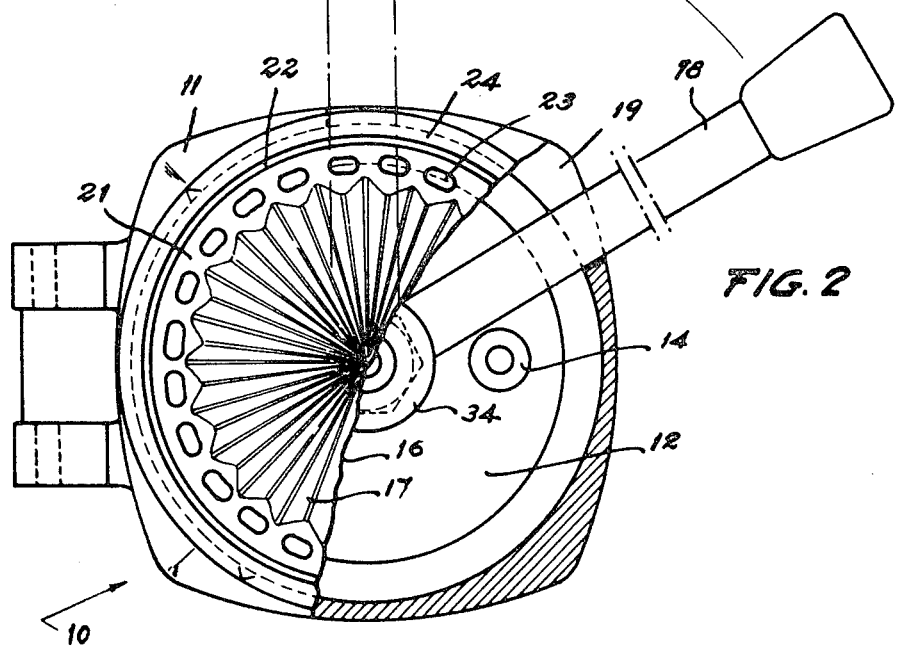
FIG. 2 is a top plan view of FIG. 1, partly sectioned and partly broken away.

Various different materials may be utilized for constructing the apparatus shown in FIGS. 1 and 2 of the present application by way of example, and these materials include plastics and metals. It will be evident that my novel apparatus may be very readily disassembled even by persons unskilled in the handling of mechanical devices so that it can be readily cleaned, with the devices even being available for sterilization if this should be necessary. Furthermore, my novel apparatus is extremely sturdy and is capable of extracting the maximum possible amount of juice from a piece of fruit because the fruit is simultaneously compressed between the members 16 and 27 and subjected to pulping for the resultant maximum juice extraction.

Finally, my novel construction is very simple and can therefore be manufactured and sold inexpensively while yet being capable of utilization for commercial and industrial use as well as household use.

It will be understood that each of the elements described above, or two or more together, may also find a useful application in other types of constructions differing from the types described above.

While the invention has been illustrated and described as embodied in a juice extractor, it is not intended to be limited to the details shown, since various modifications and structural changes may be made without departing in any way from the spirit of the present invention.

What is claimed as new and desired to be protected by Letters Patent is set forth in the appended claims.

1. A juice extractor, particularly for citrus fruits and the like, comprising in combination, a receptacle having a bottom wall and a circumferential wall bounding an upper opening; a shaft projecting upwardly from said bottom wall within the confines of said circumferential wall and having an upper free end face provided with a recess; a pulping member of substantially bowl-shaped configuration mounted in said receptacle for rotary movement and having a concave side facing the interior of the receptacle, a convex side projecting outwardly beyond said opening, and an outer circumferential surface provided with a plurality of projecting ribs; a bushing of one piece with said pulping member and projecting from said concave side concentrically therewith, said bushing being telescoped over said shaft and having an inner end face juxtaposed with said free end face; a spherical antifriction member partly received in said recess and engaging said inner end face; and handle means connected with said pulping member and projecting outwardly from said receptacle for grasping by the fingers of an operator whereby to impart rotary movement to said pulping member so that when a fruit to be extracted is pressed against said ribs, turning of said pulping member will result in pulping of the fruit and extraction of the juice therefrom.

2. A juice extractor as defined in claim 1, said circumferential wall being provided with a slot extending in circumferential direction of said receptacle and said handle means extending radially from said pulping member and outwardly through said slot.

3. A juice extractor as defined in claim 2; further comprising a shallow tray supported by said circumferential wall and closing said open end proximal to a lower edge of said pulping member, said tray being provided with a plurality of apertures dimensioned so as to permit passage of juice into said receptacle but to restrain pulp; and cooperating male and female engaging portions on said tray and said circumferential wall for preventing rotation of said tray about said shaft.

4. A juice extractor as defined in claim 1; and further comprising cap means pivoted to said receptacle and movable between a closed position in which it overlies said pulping member so as to press a fruit thereagainst, and an open position.

5. A juice extractor as defined in claim 4, said cap member having an inner surface facing said outer surface of said pulping member when said cap member is in said closed position; and further comprising projecting means provided on said inner surface and operative for engaging fruit and preventing rotation thereof when such fruit is pressed against said pulping member of said cap member.

6. A juice extractor as defined in claim 1; and further comprising outlet means in said receptacle for evacuation of juice therefrom.